(12) United States Patent
Kellner

(10) Patent No.: US 9,003,772 B2
(45) Date of Patent: Apr. 14, 2015

(54) METHOD AND CONTROL UNIT FOR METERING FUEL INTO AN EXHAUST GAS DUCT

(71) Applicant: Robert Bosch GmbH, Stuttgart (DE)

(72) Inventor: Andreas Kellner, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 13/846,990

(22) Filed: Mar. 19, 2013

(65) Prior Publication Data

US 2013/0251546 A1   Sep. 26, 2013

(30) Foreign Application Priority Data

Mar. 20, 2012  (DE) .......................... 10 2012 204 385

(51) Int. Cl.
| | | |
|---|---|---|
| *F01N 3/00* | (2006.01) | |
| *F04B 23/04* | (2006.01) | |
| *F04B 13/00* | (2006.01) | |
| *F01N 3/08* | (2006.01) | |
| *F01N 3/36* | (2006.01) | |
| *F01N 9/00* | (2006.01) | |
| *F01N 11/00* | (2006.01) | |

(52) U.S. Cl.
CPC .................. *F04B 23/04* (2013.01); *F04B 13/00* (2013.01); *F01N 3/0814* (2013.01); *F01N 3/0842* (2013.01); *F01N 3/0871* (2013.01); *F01N 3/36* (2013.01); *F01N 2610/03* (2013.01); *F01N 2610/144* (2013.01); *Y02T 10/47* (2013.01); *F01N 9/002* (2013.01); *F01N 11/00* (2013.01); *F01N 2550/05* (2013.01); *F01N 2900/1808* (2013.01)

(58) Field of Classification Search
USPC ............ 60/274, 286, 295, 297, 301, 303, 311
See application file for complete search history.

(56) References Cited

U.S. PATENT DOCUMENTS

| | | | |
|---|---|---|---|
| 6,209,315 B1 * | 4/2001 | Weigl ............................. | 60/274 |
| 8,161,735 B2 * | 4/2012 | Kitazawa ....................... | 60/295 |
| 8,171,721 B2 * | 5/2012 | Boddy et al. .................. | 60/286 |
| 8,276,437 B2 * | 10/2012 | Kitazawa ................... | 73/114.69 |
| 8,359,833 B2 * | 1/2013 | Nalla et al. .................... | 60/286 |
| 8,484,949 B2 * | 7/2013 | Sebestyen et al. ............. | 60/286 |
| 2011/0047996 A1 | 3/2011 | Garcia-Lorenzana Merino et al. | |

FOREIGN PATENT DOCUMENTS

DE    102004056412    5/2006

\* cited by examiner

*Primary Examiner* — Binh Q Tran
(74) *Attorney, Agent, or Firm* — Michael Best & Friedrich LLP

(57) ABSTRACT

A method for metering fuel from a high pressure system, comprising at least one high pressure pump, one pressure accumulator and one high pressure injection valve, into an exhaust gas duct of an internal combustion engine in order to regenerate a nitrogen oxide storage catalyst (NSC) disposed in the exhaust gas duct, wherein a higher pressure of the fuel is generated by the electrically actuated high pressure pump, which discretely delivers fuel and has a constant stroke volume, wherein the fuel is supplied to the pressure accumulator comprising a pressure measuring device for determining the fuel pressure and wherein the fuel is injected into the exhaust gas duct via the downstream, electrically actuated high pressure injection valve.

15 Claims, 3 Drawing Sheets

METHOD AND CONTROL UNIT FOR METERING FUEL INTO AN EXHAUST GAS DUCT

BACKGROUND OF THE INVENTION

The invention relates to a method for metering fuel from a high pressure system, comprising at least one high pressure pump, one pressure accumulator and one high pressure injection valve, into an exhaust gas duct of an internal combustion engine in order to regenerate a nitrogen oxide storage catalytic converter disposed in the exhaust gas duct, wherein a high pressure of the fuel is generated by the electrically actuated high pressure pump, which discretely delivers the fuel and has a constant stroke volume, wherein the fuel is supplied to the pressure accumulator comprising a pressure measuring device for determining the fuel pressure and wherein the fuel is injected into the exhaust gas duct via the downstream, electrically actuated high pressure injection valve.

The invention relates further to a method for metering fuel from a high pressure system, comprising at least one high pressure pump, one pressure accumulator and one high pressure injection valve, into an exhaust gas duct of an internal combustion engine in order to regenerate a particle filter disposed in the exhaust gas duct, wherein a higher pressure of the fuel is generated by the electrically actuated high pressure pump, which directly delivers the fuel and has a constant stroke volume, wherein the fuel is supplied to the pressure accumulator comprising a pressure measuring device for determining the fuel pressure and wherein the fuel is injected into the exhaust gas duct via the downstream, electrically actuated high pressure injection valve.

The invention further relates to a control unit for carrying out the method.

In order to reduce toxic emissions of internal combustion engines, different catalysts and filters are provided today in exhaust gas aftertreatment systems that are correspondingly provided. Thus, for example, in the case of diesel engines, diesel particle filters and NOx storage catalysts can be provided in addition to oxidation catalysts for oxidizing hydrocarbons and carbon monoxide.

Particle filters are used for reducing particle emissions. The exhaust gas is led through the particle filter, which separates out solid particles and retains said particles in a filter substrate. As a result of the soot masses embedded in the filter substrate, the particle filter becomes clogged with time. This fact is detected by an increase in the flow resistance and thereby in the exhaust gas back pressure. For this reason, the embedded soot mass must be discharged from time to time in a regeneration process. The regeneration is introduced by an increase in the exhaust gas temperature to typically 600° C. to 650° C., so that the soot embedded in the particle filter begins to burn off. In particular at low loads on the internal combustion engine and low rotational speeds of said internal combustion engine, measures inside the engine itself are to be provided in order to achieve the necessary temperatures for regeneration, for example in the fuel-mixture generation of the engine or by measures taken downstream of the engine such as an afterinjection (HCI: hydrocarbon injection) into the exhaust gas duct, which combusts at the oxidation catalyst. When the exhaust gas temperature is sufficiently high, an exothermal reaction is initiated in the particle filter, which causes a burn-off of the soot particles and regenerates said particle filter within a matter of minutes (e.g. 20 minutes).

NOx storage catalysts (NSC: $NO_x$ storage catalyst) serve to reduce the $NO_x$ emissions from internal combustion engines. During the operation of the internal combustion engine, $NO_2$ is embedded in the $NO_x$ storage catalyst. NO is thereby oxidized to $NO_2$ in an upstream oxidation catalyst. If the $NO_2$ storage limit of the $NO_x$ storage catalyst is achieved, said $NO_x$ storage catalyst must be regenerated. In order to provide the carbon monoxide necessary for this purpose, the exhaust gas must have a lambda value >1. In the case of lean running diesel engines, provision can also be made for the injection of fuel into the exhaust gas duct.

The German patent specification DE 10 2008 013 406 A1 describes a device for metering at least one emission reducing medium into an exhaust gas system, in particular for introducing fuel into an exhaust gas tract in order to regenerate an emission reducing element in the exhaust gas tract, comprising at least one injection valve, in particular a pressure-controlled injection valve, and at least one feed line for feeding the emission reducing medium to the injection valve, wherein at least one pressure damper is provided in the feed line upstream of the injection valve. In such a system, fuel from a low pressure system, which is supplied by a continuously operating low pressure pump, is, for example, metered via a metering valve and injected into the exhaust gas duct via the pressure-controlled injection valve.

Based on such a device, the German patent specification DE 10 2004 056 412 A1 describes a method for operating an internal combustion engine, in the exhaust gas region of which an exhaust gas treatment device is disposed, in which method a reagent is introduced into the exhaust gas region upstream of the exhaust gas treatment device, in which method initially an adjustable reagent safety valve (ReaCV), then a continuous reagent metering valve (ReaDV) and thereafter a reagent introduction check valve (ReaIV) are disposed in the direction of flow of the reagent, which is brought to a predefined reagent source pressure (pQRea), in which method the reagent pressure (pRea) is detected in the reagent path, which lies between the reagent metering valve (ReaDV) and the reagent introduction check valve (ReaIV), in which method the reagent pressure (pRea) detected in at least one predefined state of the reagent safety valve (ReaCV) and/or the reagent metering valve (ReaDV) is compared to at least one threshold value (pU, pabg, dpReaIV, pQRea, dpRea/dt) and a fault signal is outputted if the threshold value is exceeded. The method facilitates a check as to whether a leak is present in the reagent path and a check of the function of the valves provided therefore.

Aside from the low pressure injection systems described, metering systems are known, which introduce reagent into the exhaust gas duct at high pressures. Such systems are configured from a low pressure system and a high pressure system and facilitate, for example, the introduction of fuel into the exhaust gas duct. The low pressure system delivers the fuel from a tank to a high pressure pump of the high pressure system. The high pressure pump relates, for example, to a magnetically operated pump, which discretely delivers the fuel and has a constant stroke volume, which pump compresses the fuel to a high pressure, for example to 30 bar. The fuel is sprayed into the exhaust gas duct via a downstream high pressure accumulator, which can be embodied as a piston accumulator, and a high pressure injection valve (HDEV).

SUMMARY OF THE INVENTION

It is the aim of the invention to provide a control strategy for the regeneration of a nitrogen oxide storage catalyst (NSC) and a control strategy for the regeneration of a particle filter for a high pressure system for introducing fuel into an exhaust gas duct of an internal combustion engine.

It is furthermore the aim of the invention to provide a corresponding control unit for carrying out the method.

The aim of the invention, which relates to the method for regenerating a nitrogen oxide storage catalyst (NSC) disposed in the exhaust gas duct, is met by virtue of the fact that the high pressure pump is switched on and off by an actuation signal HDEV having a constant cycle duration $T_F$, by virtue of the fact that the delivery volume of the high pressure pump is predefined by an actuation time $T_P$ per cycle, by virtue of the fact that the fuel quantity Q injected into the exhaust gas duct is extracted out of the pressure accumulator temporally independently of the actuation of the high pressure pump by means of opening the high pressure injection valve, by virtue of the fact that the high pressure pump is not actuated if the fuel pressure lies above a predefined target value and by virtue of the fact that the high pressure pump is actuated if the fuel pressure lies below the predefined target value.

The quantity of fuel required for the regeneration of the nitrogen oxide storage catalyst (NSC) can be extracted as required from the pressure volume of the pressure accumulator. Because the high pressure pump is only turned on if the fuel pressure in the high pressure system drops below a target value, the fuel pressure is held constant in a narrow control range by extracting fuel when fuel is injected into the exhaust gas duct, whereby an exact metering of the fuel quantity to be injected into the exhaust gas duct is made possible. The high pressure pump is thereby only operated as long as it is necessary to bring up the required quantity of injected fuel and fuel, which escapes via leaks out of the high pressure system. The pressure control can, for example, take place via a two-point controller.

Tolerances in the actually injected fuel quantity Q can thereby be reduced as a result of the high pressure pump not being actuated during the injection of fuel into the exhaust gas duct.

The frequency of actuation of the high pressure pump is predefined by means of the constant actuation frequency $1/T_F$. The delivery volume of the high pressure pump results from the actuation time $T_P$ per cycle, which preferably is designed for a delivery stroke of the high pressure pump. In order to achieve this end, provision can be made for the actuation time $T_P$ from a characteristic diagram to be predefined as a function of the fuel pressure and a supply voltage of the high pressure pump such that a full delivery stroke of the high pressure pump is achieved.

In the case of a high pressure pump which discretely delivers the fuel and has a constant stroke volume, the fuel volume delivered per unit of time results from the number of delivery strokes that have occurred in the unit of time. Within the framework of an on-board diagnostics, provision can be made for a leakage rate to be determined from a number of delivery strokes of the high pressure pump and the injected fuel quantity and for an error message to be outputted if the leakage rate exceeds a predefined threshold value. The leakage rate results from the difference between the fuel delivered by the high pressure pump per unit of time and the fuel injected into the exhaust gas duct in the unit of time. It is essential for the exact determination of the leakage rate that the fuel pressure be held within the limits of the control tolerance.

Aside from the delivered and the injected fuel volume, the leakage rate is a function of further parameters. Provision can therefore be made for further parameters, in particular the fuel pressure or the operating current of the high pressure pump, to be taken into account.

The aim of the invention relating to the method for regenerating a particle filter disposed in the exhaust gas duct of the internal combustion engine is met by virtue of the fact that a predetermined fuel quantity Q injected into the exhaust gas duct is predefined by an opening duration $T_E$ within a cycle $T_F$ of a cyclical actuation of the high pressure injection valve, by virtue of the fact that a post-delivery of fuel results by means of a cyclical actuation of the high pressure pump, which takes place synchronously to the actuation of the high pressure injection valve, such that the high pressure pump and the high pressure injection valve are actuated in a temporally displaced manner and not in an overlapping manner, by virtue of the fact that fuel quantity Q injected in a cycle and a maximum permissible leakage rate of the fuel out of the high pressure system is smaller than the fuel quantity required by a delivery stroke of the high pressure pump, by virtue of the fact that the high pressure pump is not actuated within a cycle if the fuel pressure lies above a predefined target value, by virtue of the fact that the high pressure pump is actuated if the fuel pressure lies below the predefined target value and by virtue of the fact that the fuel quantity Q injected in a cycle is varied in an adaptation process such that the high pressure pump is not actuated in a predefined, maximum proportion of cycles.

Fuel is extracted in an alternating manner from the high pressure system and subsequently fed back to the same by means of the synchronous, alternating actuation of the high pressure injection valve and the high pressure pump. The actuation of the high pressure pump is thereby preferably selected such that a delivery stroke having a delivery volume that is predefined by the geometry of the high pressure pump results per actuation. The fuel quantity Q injected into the exhaust gas duct per injection process is selected in such a manner that said quantity, together with a maximum admissible leakage rate from the high pressure system, can be post-delivered from the high pressure pump by means of a delivery stroke. In the case of an actual lower leakage rate, the high pressure pump delivers more fuel than is extracted from the high pressure system. For that reason, the high pressure pump is not actuated in several cycles as a result of the fuel pressure which then rises above the target value. The fuel pressure can thus be controlled in a narrow range, whereby an exact metering of the fuel quantity to be injected into the exhaust gas duct is made possible. It is furthermore ensured that fuel which escapes the high pressure system through leaks is sufficiently post-delivered. The adaptation process ensures that the delivery volume potential of the high pressure pump is fully utilized. The fuel quantity Q injected per injection process is thereby increased or respectively reduced until only a predefined proportion of delivery strokes is suppressed. Provision can thus be made for the injected fuel quantity Q to be adapted until only every twentieth delivery stroke is omitted, which corresponds to a delivery rate of 95% with respect to the maximum delivery rate of the high pressure pump. By means of the adaptation, an exemplar and temperature dependent leakage of the high pressure system can be compensated and does not have to be maximally held available by the high pressure pump in order to be able to safely adjust the target pressure even in the case of larger leakage rates. The fuel quantity injected into the exhaust gas duct per unit of time can be changed by means of the frequency $1/T_F$, with which the high pressure injection valve and the high pressure pump is actuated.

The control of the fuel pressure can occur via a two-point controller. The regeneration of a particle filter and the regeneration of a nitrogen oxide storage catalyst (NSC) can therefore take place via the same high pressure system and the same control unit, wherein only the different open-loop or closed-loop strategies described are provided for the different operating modes (regeneration of the particle filter and regeneration of the nitrogen oxide storage catalyst (NSC)).

In order to ensure a synchronous, temporally displaced actuation of the high pressure pump and the high pressure injection valve, provision can be made for the actuation of said high pressure pump and the actuation of said high pressure injection valve to occur temporally displaced by a half cycle.

The fuel quantity Q injected per injection process is set by a specification of the opening duration $T_E$ per cycle. Because, aside from the opening duration, the current fuel pressure can influence the quantity of injected fuel, provision can be made for the opening duration $T_E$ to be predefined as a function of the fuel pressure and the predetermined fuel quantity Q.

Corresponding to a preferred embodiment variant of the invention, provision can be made for the high pressure pump not to be actuated if the fuel pressure lies above a predefined target value that is increased by an admissible control deviation and for the high pressure pump to actuated if the fuel pressure lies below the predefined target value that is reduced by an admissible control deviation. The fuel pressure is thereby held constant within the framework of an admissible tolerance. An oscillation of the control loop is thus reliably prevented.

A sufficiently large fuel pressure can be achieved as a result of a fuel pressure greater than 10 bar, preferably greater than 25 bar, being generated by the high pressure pump.

The aim of the invention relating to the control unit is met by a control unit for actuating a high pressure pump and a high pressure injection valve of a high pressure system for metering fuel into an exhaust gas duct of an internal combustion engine in order to carry out the method described.

The method and the control unit can be used in a preferred manner for regenerating a nitrogen oxide storage catalyst (NSC) and a diesel particle filter (DPF) in the exhaust gas duct of a diesel engine.

BRIEF DESCRIPTION OF THE DRAWINGS

The invention is explained below in detail with the aid of an exemplary embodiment depicted in the figures. In the drawings.

DETAILED DESCRIPTION

Figure 1:
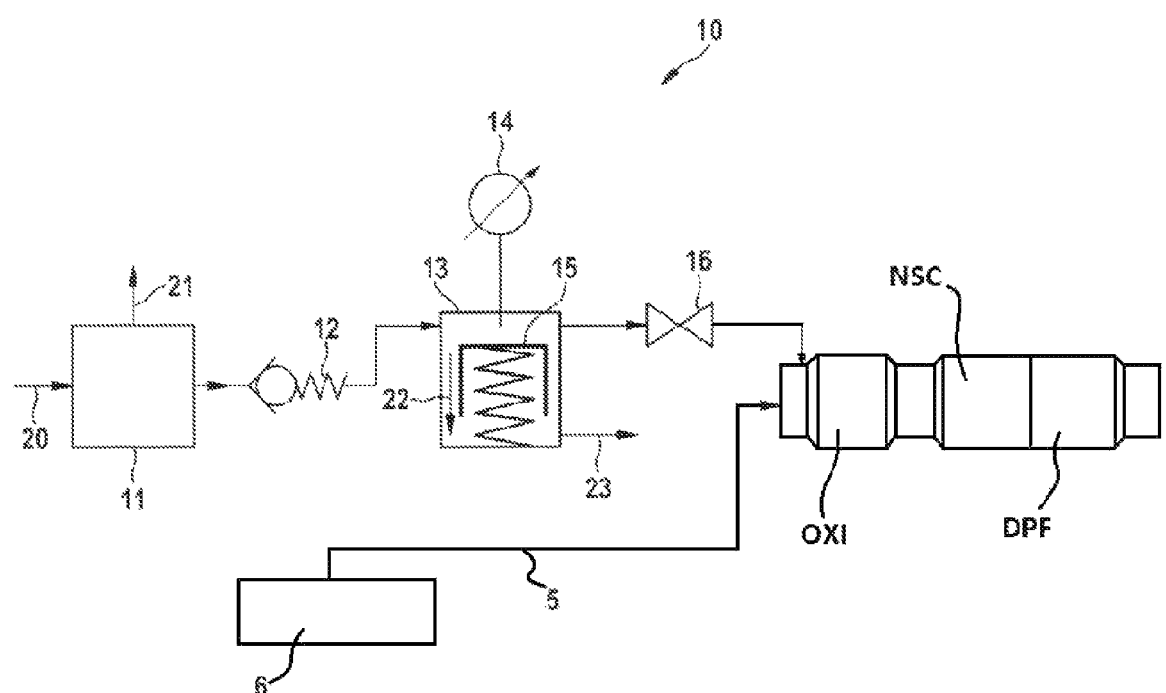
FIG. 1 shows a high pressure system for introducing fuel into an exhaust gas duct in schematic depiction.

FIG. 1 shows a high pressure system 10 for introducing fuel into an exhaust gas duct 5 of a diesel engine 6 in schematic depiction. Fuel, which is compressed to a pressure of 30 bar via a high pressure pump 11, is supplied to the high pressure system 10 via a low pressure fuel supply 20. The high pressure pump 11 is embodied as a magnetically operated HCI pump, which discretely delivers fuel and has a constant stroke volume. The compressed fuel arrives at a pressure accumulator 13 in the form of a piston accumulator via a pressure valve 12, the pressure of the fuel that has built up being maintained by a piston in said piston accumulator. The fuel pressure is determined using a pressure measuring device 14. The fuel is metered into the exhaust gas duct with a high pressure injection valve 16.

Disturbance variables are leaks in the high pressure system 10. Thus, a first fuel leak 21 at the high pressure pump 11 and a second fuel leak 22 at the pressure accumulator 13 along the piston 15 are depicted. Fuel, which escapes at the piston 15 out of the high pressure region of the pressure accumulator 13, is fed via a fuel return 23, for example, to a fuel tank or to the low pressure system of the fuel supply system.

The high pressure system 10 facilitates the regeneration of a nitrogen oxide storage catalyst (NSC) disposed in the exhaust gas duct and a diesel particle filter (DPF) likewise provided in the exhaust gas duct by means of an after-injection (HCI: hydrocarbon injection) combusting at an oxidation catalyst. A valve, like that used for the fuel metering in a gasoline direct injection (GDI), is provided as the high pressure injection valve 16.

Different fuel dosages are required for the regeneration of the nitrogen oxide storage catalyst (NSC) and the diesel particle filter (DPF). This requires different control strategies for the high pressure system 10 for the two operating modes.

Figure 2:
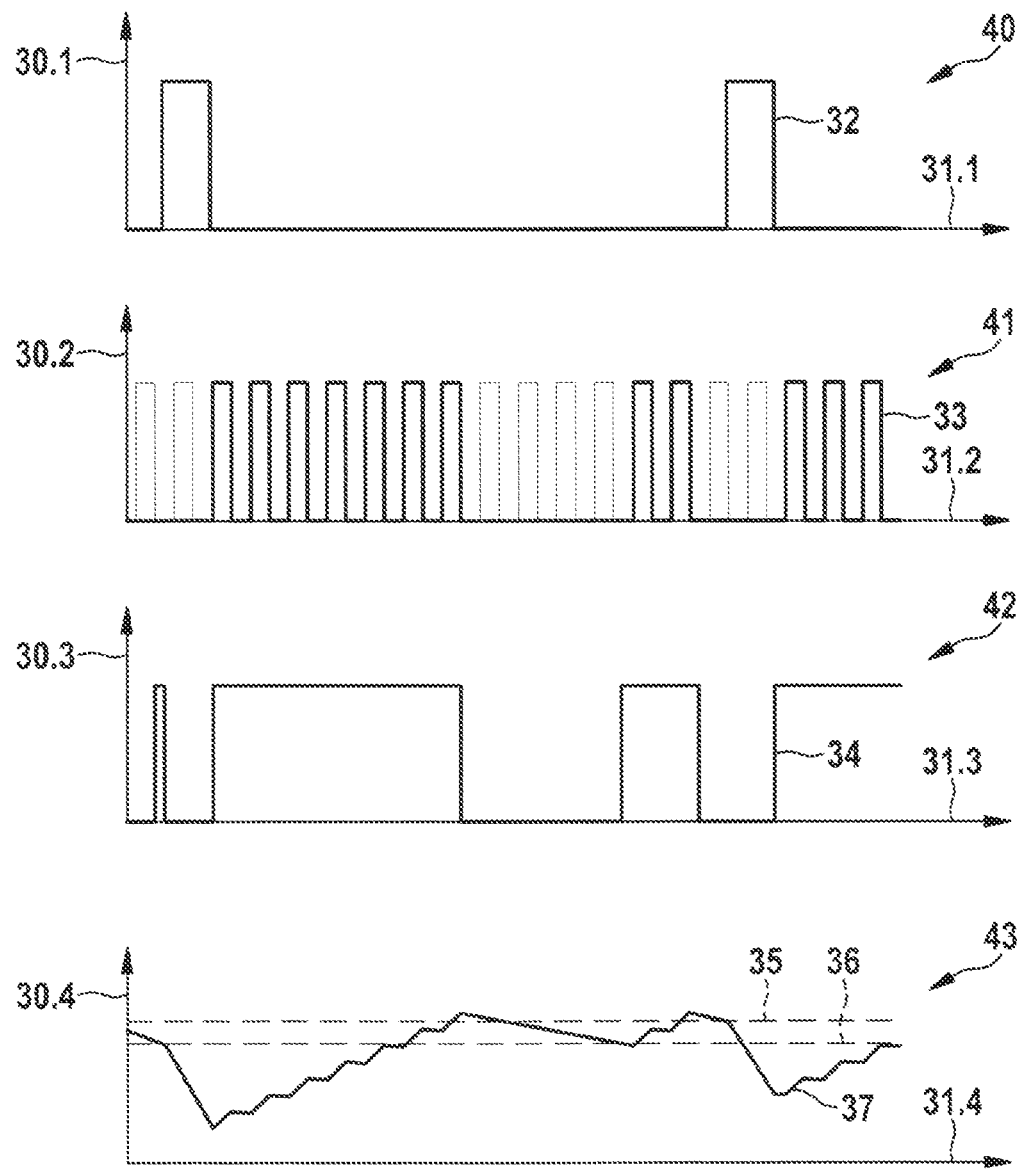
FIG. 2 shows a control strategy for regenerating a nitrogen oxide storage catalyst (NSC)

FIG. 2 shows a control strategy for regenerating a nitrogen oxide storage catalyst (NSC) with the high pressure system 10 depicted in FIG. 1. An actuation signal HDEV 32 is depicted with respect to a first signal axis 30.1 and a first time axis 31.1. A second diagram 41 shows an actuation signal: magnetic pump 33 with respect to a second signal axis 30.2 and a second time axis 31.2. In a third diagram 42, an enabling signal 34 is plotted with respect to a third signal axis 30.3 and a third time axis 31.3. In a fourth diagram, a temporal course of a fuel pressure 37 is depicted with respect to a pressure axis 30.4 and a fourth time axis 31.4. In addition, an upper limit 35 and a lower limit 36 for the fuel pressure 37 are plotted in the fourth diagram 43.

The time axes 31.1, 31.2, 31.3, 31.4 are scaled in the same way; and therefore the courses of the signals are simultaneously depicted one on top of the other in the four diagrams 40, 41, 42, 43.

The high pressure injection valve 16 shown in FIG. 1 is actuated by the actuation signal HDEV 32 and fuel is correspondingly metered from the high pressure system 10 into the exhaust gas duct 5. The high pressure pump 11 is switched on and off by means of the actuation signal: magnetic pump 33. The enabling signal 34 indicates the time periods in which the high pressure pump 11 can be switched on. The temporal course of the fuel pressure 37 measured in the pressure accumulator 13 depicted in FIG. 1.

During the regeneration of the nitrogen oxide storage catalyst (NSC), the high pressure injection valve 16 is typically actuated having a cycle duration $T_D$ in the range of 2 to 4 seconds. The opening time $T_E$ per cycle $T_D$ is thereby predefined as a function of the required quantity of injected fuel and the fuel pressure 37. The fuel pressure 37 drops in the high pressure system 10 by opening the high pressure injection valve 16. If the fuel pressure 37 falls below the depicted lower limit 36, the fuel delivery by the high pressure pump 11 is enabled by the enabling signal 34 via a corresponding two-point control. The high pressure pump 11 is actuated with a constant frequency $1/T_F$. In so doing, the actuation time $T_P$ per cycle $T_F$ is predefined from a characteristic diagram as a function of the fuel pressure 37 and a supply voltage $U_B$ of the high pressure pump 11 such that a complete delivery stroke of the high pressure pump 11, which is designed as a magnetically operated HCI pump, is ensured. If the fuel pressure 37 reaches the upper limit 35, the enabling signal 34 is reset and the actuation of the high pressure pump 11 is suspended. In order to reduce tolerances during the metering of the injected fuel quantity, the actuation of the high pressure pump 11 is suspended by a corresponding enabling signal 34 during the injection of the fuel into the exhaust gas duct.

The control strategy ensures that only the fuel quantity extracted from the high pressure system 10 by means of injection or leaks is post-delivered.

The delivery quantity per delivery stroke is known for the utilized high pressure pump 11 which discretely delivers fuel and has a constant stroke volume. At a known quantity of fuel injected into the exhaust gas duct, the current leakage rate from the high pressure system 11 can be determined from the number of delivery strokes and can be monitored within the framework of an on-board diagnostics (OBD). If the leakage rate exceeds a predefined threshold value, a corresponding error message can be outputted. At the same time, further sensor signals, such as fuel pressure 37 or the operating current of the high pressure pump 11 can be taken into account.

Figure 3:
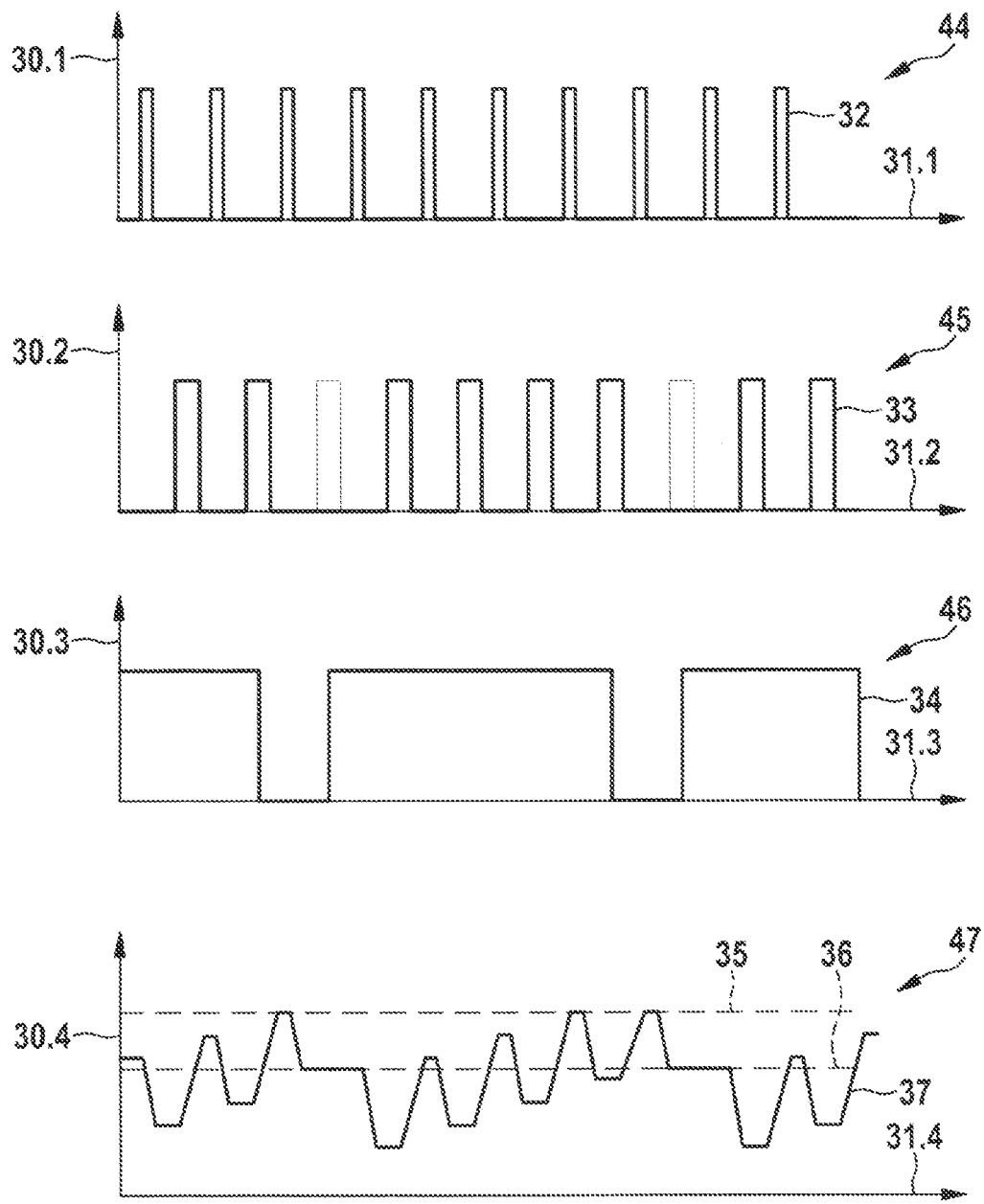
FIG. 3 shows a control strategy for regenerating a diesel particle filter (DPF).

FIG. 3 shows a control strategy for regenerating a diesel particle filter (DPF) using the high pressure system 10 depicted in FIG. 1. The same identifiers are thereby used as introduced with regard to FIG. 2. A fifth diagram 44 shows the temporal course of the actuation signal HDV 32, a sixth diagram 45 the actuation signal: magnetic pump 33, a seventh diagram 46 the enabling signal 34 and an eighth diagram 47 the temporal course of the fuel pressure 37.

During the regeneration of the diesel particle filter (DPF), the high pressure injection valve 16 and the high pressure pump 11 are synchronously actuated in an alternating manner with a frequency $1/T_F$. The actuation of the high pressure pump 11 is thereby temporally displaced by a half cycle $T_F$ with respect to the actuation of the high pressure injection valve 16. The fuel is injected into the exhaust gas duct 5 with a constant quantity of injected fuel Q, which is post-delivered in each cycle of the high pressure pump 11. The quantity of injected fuel Q is thereby selected such that a delivery stroke of the discretely conveying high pressure pump 11 compensates for the quantity of injected fuel Q and all leakages from the high pressure system 10.

By means of the two-point control already described with regard to FIG. 2, the actuation of the high pressure pump 11 is suspended in accordance with the depicted enabling signal 34 if the fuel pressure 37 exceeds the upper limit 35. The quantity of injected fuel Q and the delivery quantity by the high pressure pump 11 are designed such that all admissible leakages are reliably compensated. For that reason, the delivery quantity of the high pressure pump 11 is greater than the fuel quantity extracted from the high pressure system 10 in the case of lower leakage rates. By means of this increasing delivery quantity, the fuel pressure 37 periodically rises above the upper limit 35, whereby a delivery stroke of the high pressure pump 11 is cyclically omitted. In order to fully utilize the delivery quantity potential of the high pressure pump 11, the quantity of injected fuel Q is increased or respectively again reduced via a slow adaptation up to maximally the geometric delivery volume of said high pressure pump 11, until only a predefined proportion of delivery strokes is omitted. In so doing, exemplar and temperature dependent leakages during operation can be compensated, which without the adaptation have to be maximally taken into account in order to be able to reliably maintain the required fuel target pressure in the high pressure system 10.

The control strategies depicted in FIG. 2 and FIG. 3 facilitate a demand appropriate injection of fuel into the exhaust gas duct 5 via the same two-point control for the high pressure systems 10 comprising high pressure pumps 11 that discretely deliver fuel and the regeneration of a nitrogen oxide storage catalyst (NSC) as well as the regeneration of a diesel particle filter (DPF). In so doing, a monitoring of the fuel leakage rate from the high pressure system 10, for example within the framework of an on-board diagnostics (OBD), is possible. As a result of the learning function during the regeneration of the diesel particle filter (DPF), the influence of manufacturing variations and temperature on the leakage rate from the high pressure system 10 can be compensated, whereby the delivery quantity potential of the high pressure pump 11 can be fully utilized.

What is claimed is:

1. A method for metering fuel from a high pressure system (10) having, at least one electrically actuated high pressure pump (11), one pressure accumulator (13) and one downstream, electrically actuated high pressure injection valve (16), into an exhaust gas duct of an internal combustion engine in order to regenerate a nitrogen oxide storage catalyst (NSC) disposed in the exhaust gas duct, the method comprising:

pressurizing fuel with the high pressure pump (11), which discretely delivers fuel and has a constant delivery stroke, supplying the fuel to the pressure accumulator (13) which includes a pressure measuring device (14) for determining fuel pressure (37), injecting the fuel into the exhaust gas duct via the downstream, electrically actuated high pressure injection valve (16), wherein the high pressure pump (11) is switched on and off by an actuation signal HDEV (32) from a control unit, the actuation signal HDEV (32) having a constant cycle duration $T_F$, in that the delivery volume of said high pressure pump (11) is predefined by an actuation time $T_P$ per cycle, wherein a fuel quantity Q injected into the exhaust gas duct is extracted from the pressure accumulator (13) temporally independently of actuation of said high pressure pump (11) by opening the high pressure injection valve (16), and wherein said high pressure pump (11) is not actuated if the fuel pressure (37) lies above a predefined target value and said high pressure pump (11) is actuated if the fuel pressure (37) lies below the predefined target value, wherein the control unit maintains the actuation signal HDEV (32) in the off state to prevent actuation of the high pressure pump (11) during injection of fuel from the high pressure injection valve (16) into the exhaust gas duct.

2. The method according to claim 1, characterized in that the actuation time Tp is predefined from a characteristic diagram as a function of the fuel pressure (37) and a supply voltage of the high pressure pump (11) such that a complete delivery stroke of said high pressure pump (11) is achieved.

3. The method according to claim 1, characterized in that a leakage rate of the high pressure system (10) is determined from a number of delivery strokes of the high pressure pump (11) and the injected fuel quantity and in that an error message is outputted if the leakage rate exceeds a predefined threshold value.

4. The method according to claim 3, characterized in that further parameters are taken into account when determining the leakage rate.

5. A method for metering fuel from a high pressure system (10), comprising at least one electrically actuated high pressure pump (11), one pressure accumulator (13) and one downstream, electrically actuated high pressure injection valve (16), into an exhaust gas duct of an internal combustion engine for regenerating a particle filter disposed in the exhaust gas duct, wherein a high pressure of the fuel is generated by the high pressure pump (11), which discretely delivers fuel and has a constant delivery volume, wherein the fuel is supplied to the pressure accumulator (13) comprising a pressure measuring device (14) for determining fuel pressure

(37) and wherein the fuel is injected into the exhaust gas duct via the downstream, electrically actuated high pressure injection valve (16), characterized in that a predetermined fuel quantity Q injected into the exhaust gas duct is predefined by an opening duration $T_E$ within a cycle $T_F$ of a cyclical actuation of the high pressure injection valve (16), in that a post-delivery of the fuel takes place by means of a cyclical actuation of the high pressure pump (11) that results synchronously to the actuation of the high pressure injection valve (16) such that said high pressure pump (11) and said high pressure injection valve (16) are actuated in a temporally displaced manner and not in an overlapping manner, in that the quantity of fuel Q injected in a cycle and a maximum permissible leakage rate of the fuel from the high pressure system (10) is smaller than a quantity of fuel required with a delivery stroke of said high pressure pump (11), in that said high pressure pump (11) is not actuated within a cycle if the fuel pressure (37) lies above a predefined target value, in that said high pressure pump (11) is actuated if the fuel pressure (37) lies below the predefined target value and in that the quantity of fuel Q injected in a cycle is varied such that said high pressure pump (11) is not actuated in a predefined maximum proportion of cycles.

6. The method according to claim 5, characterized in that actuation of the high pressure pump (11) and actuation of the high pressure injection valve (16) occur temporally displaced by a half cycle.

7. The method according to claim 5, characterized in that the opening duration $T_E$ is predefined as a function of the fuel pressure (37) and the predetermined quantity of fuel Q.

8. The method according to claim 5, characterized in that the high pressure pump (11) is not actuated if the fuel pressure (37) lies above a predefined target value that is increased by an admissible control deviation and in that said high pressure pump (11) is actuated if the fuel pressure (37) lies below the predefined target value that is reduced by an admissible control deviation.

9. The method according to claim 5, characterized in that a fuel pressure (37) greater than 10 bar is generated by the high pressure pump (11).

10. A control unit for actuating a high pressure pump (11) and a high pressure injection valve (16) of a high pressure system (10) for metering fuel into an exhaust gas duct of an internal combustion engine in order to carry out a method according to claim 1.

11. The method according to claim 3, characterized in that fuel pressure (37) or the operating current of the high pressure pump (11) are taken into account when determining the leakage rate.

12. The method according to claim 1, characterized in that the high pressure pump (11) is not actuated if the fuel pressure (37) lies above a predefined target value that is increased by an admissible control deviation and in that said high pressure pump (11) is actuated if the fuel pressure (37) lies below the predefined target value that is reduced by an admissible control deviation.

13. The method according to claim 1, characterized in that a fuel pressure (37) greater than 25 bar is generated by the high pressure pump (11).

14. The method according to claim 5, characterized in that a fuel pressure (37) greater than 10 bar is generated by the high pressure pump (11).

15. The method according to claim 5, characterized in that a fuel pressure (37) greater than 25 bar is generated by the high pressure pump (11).

\* \* \* \* \*